(12) United States Patent
Hashiguchi et al.

(10) Patent No.: US 6,382,633 B1
(45) Date of Patent: May 7, 2002

(54) SHAFT SEAL DEVICE USING GLAND PACKING

(75) Inventors: Hideto Hashiguchi; Takahisa Ueda, both of Hyogo (JP)

(73) Assignee: Nippon Pillar Packing Co., Ltd., Osaka (JP)

( * ) Notice: Subject to any disclaimer, the term of this patent is extended or adjusted under 35 U.S.C. 154(b) by 0 days.

(21) Appl. No.: 09/445,847

(22) PCT Filed: Apr. 12, 1999

(86) PCT No.: PCT/JP99/01947

§ 371 Date: Dec. 15, 1999

§ 102(e) Date: Dec. 15, 1999

(87) PCT Pub. No.: WO99/56043

PCT Pub. Date: Nov. 4, 1999

(30) Foreign Application Priority Data

Apr. 27, 1998 (JP) .......................................... 10-116561

(51) Int. Cl.[7] ................................................ F16S 15/18
(52) U.S. Cl. ........................ 277/511; 277/516; 277/523
(58) Field of Search ............................... 277/511, 516, 277/520, 521, 522, 524, 523

(56) References Cited

U.S. PATENT DOCUMENTS

| 860,035 A | * | 7/1907 | Kerr |
| 2,608,424 A | * | 8/1952 | Everett |
| 3,638,956 A | * | 2/1972 | Dagwell |
| 4,408,769 A | * | 10/1983 | Wolff |
| 4,582,329 A | | 4/1986 | Stalph |
| 4,623,152 A | * | 11/1986 | St Jean |
| 4,795,171 A | * | 1/1989 | Quevedo Del Rio |
| 4,936,592 A | * | 6/1990 | Vaisanen |
| 5,171,022 A | | 12/1992 | Fessmann |
| 5,333,883 A | | 8/1994 | Piper et al. |
| 5,549,305 A | | 8/1996 | Freund |
| 5,727,793 A | * | 3/1998 | Gosselin |

* cited by examiner

Primary Examiner—Anthony Knight
Assistant Examiner—Alison K. Pickard
(74) Attorney, Agent, or Firm—Griggin & Szipl, P.C.

(57) ABSTRACT

A shaft seal apparatus that exhibits a good and reliable sealing performance, even when a rotating shaft undergoes axial vibration, eccentric revolution, or the like. This shaft seal apparatus has gland packings (2) stuffed in a sealed space (10) formed between a rotating shaft (9) and a stuffing box (1), with gland packings (2) pressed between a first packing gland (3) on a sealed liquid region side (7) and a second packing gland (4) on an atmospheric region side (8). The first packing gland (3) is fixed to a rotary equipment body (6) and the second packing gland (4) is to the stuffing box (1). A screw bolt (15) extending in the axial direction of the rotating shaft (9) is anchored to the first packing gland (3). The stuffing box (1) is provided with a through hole (16) larger than the screw bolt (15) in the flange (1a). The screw bolt (15) running through the through hole (16) has a tightening nut (17) thereon at a place which is out of and backward of the hole (16). A compression coil spring (18) is mounted on screw bolt (15) between flange (1a) and tightening nut (17).

6 Claims, 11 Drawing Sheets

F I G. 2
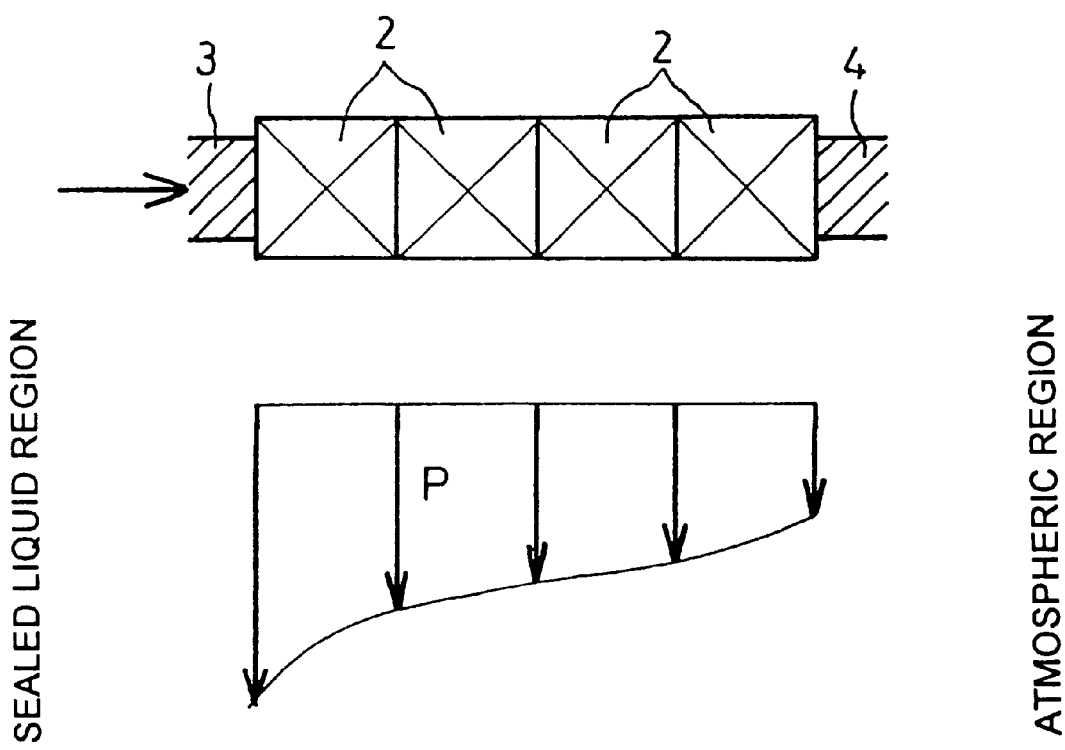

F I G. 6
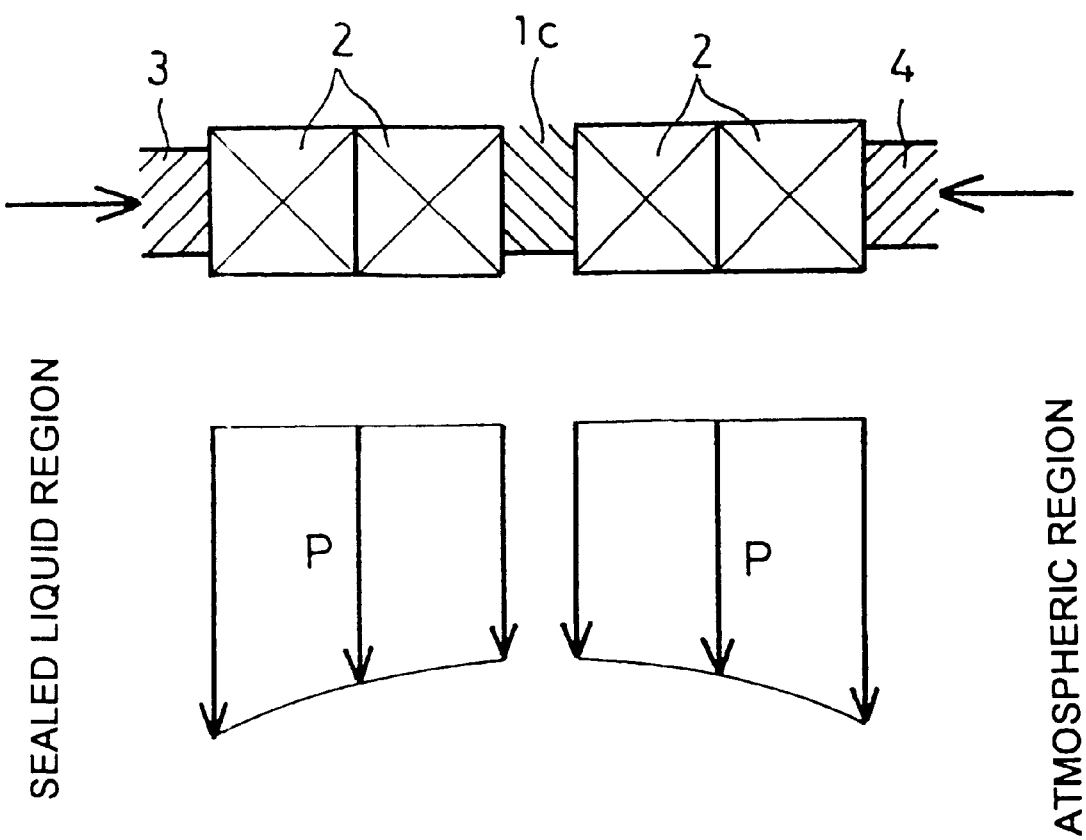

SEALED LIQUID REGION

ATMOSPHERIC REGION

SHAFT SEAL DEVICE USING GLAND PACKING

BACKGROUND OF THE INVENTION

1. Field of the Invention

The present invention relates to a shaft seal apparatus that seals the shaft of rotary equipment using gland packings.

2. Description of Prior Art

A known shaft seal apparatus of the sort to which the present invention relates is shown in FIG. 10. This example of the prior art comprises a cylindrical stuffing box 1, a plurality of gland packings 2, a first packing gland 3, and a second packing gland 4. The cylindrical stuffing box 1 is mounted around a rotating shaft 9 of a rotary equipment body 6, with the gland packings 2 placed side by side in the axial direction in a cylindrical sealed space 10 formed between the rotating shaft 9 and the stuffing box 1. Those gland packings 2 are pressed between the first packing gland 3 on the side of a sealed liquid region and the second packing gland 4 on an atmospheric region side. In that way, the rotating shaft 9 is sealed to isolate an inner sealed liquid region 7 of a rotary equipment from an atmospheric region 8.

As shown, the prior art apparatus has the stuffing box 1 formed integrally with the first packing gland 3, with the second packing gland 4 held movably in the axial direction by a screw bolt 28. The screw bolt 28 is secured to the stuffing box 1 and has a tightening nut 29 thereon. This tightening nut 29 is tightened to press the gland packings 2 against the first packing gland 3. The tightening of tightening nut 29 can be adjusted to properly regulate the pressure at which the gland packing are pressed.

The following problems are known with the prior art apparatus in which the stuffing box 1 is fixed to the rotary equipment body 6. That is, in case the rotating shaft 9 vibrates or goes eccentric, there will occur a change in the relative positions of the stuffing box 1 and the rotating shaft 9 in the axial direction or radial direction, with the result that proper shaft sealing cannot be maintained.

If the relative positions of the stuffing box 1 and the rotating shaft 9 change in the radial direction, that is, if the gap between the circumferential surfaces of the two parts 1 and 9 changes, the contact pressure with which the gland packings 2 are pressed against the rotating shaft 9 will be uneven in the circumferential direction. The contact pressure will fall where the gap between the circumferential surfaces increases and will rise where the gap decreases. In the area where the contact pressure decreases, there will be a decrease or failure in packing or sealing performance. And where the contact pressure increases, abnormal wear due to contacts between the gland packing 2 and the rotary shaft 9 will occur. In other words, the overall shaft sealing could deteriorate.

Another problem with the prior art is as follows. The prior art apparatus is built so that the tightening nut 29 is tightened to move the second packing gland 4 toward the first packing gland 3 formed integrally with the stuffing box 1, thus pressing the gland packings 2 against the first packing gland 3. That is, the pressing force by the second packing gland 4 successively propagates from the gland packings 2 on the atmospheric region side which the pressing force directly acts on toward the adjacent gland packings 2 on the sealed liquid region side. The tightening pressure which the gland packings 2 are subjected to (or compression in the axial direction of the gland packings 2) decreases toward the sealed liquid side. In turn, the contact pressure with which the gland packings 2 are pressed against the rotating shaft 9 (and the stuffing box 1), that is, the shaft sealing force P, falls toward the sealed liquid region side as shown in FIG. 11, with the shaft sealing force P of the gland packing closest to the sealed liquid region and engaged with the first packing gland 3 being lowest. That is not desirable for a shaft seal apparatus, an object of which is to seal the shaft from the sealed liquid region 7. In the case where the sealed liquid region 7 comes under a very high pressure or great pressure fluctuation, for example, a good and stable shaft sealing performance could not be expected from such a shaft seal apparatus.

SUMMARY OF THE INVENTION

The present invention addresses those problems with the prior art. It is an object of the present invention, therefore, to provide a shaft seal apparatus that allows gland packings to maintain a good and stable shaft sealing performance even when the shaft vibrates or goes eccentric.

To achieve the object of the present invention, the following two features are incorporated in a shaft scaling apparatus in which gland packings are placed in a cylindrical space formed between a rotating shaft and a stuffing box surrounding the outer circumferential surface of the rotating shaft; and gland packings are clamped by a first packing gland on a sealed liquid region side and a second packing gland on an atmospheric region side, to seal a shaft from a sealed liquid.

The first feature is that the first packing gland is fixed to a rotary equipment body while the second packing gland is fixed to the stuffing box; wherein a first packing tightening mechanism is provided between and connects the first packing gland and the stuffing box such that the first packing gland and the stuffing box are movable relative to one another within specific ranges in the axial and radial directions of the shaft and are urged in the axial direction and held at specific, relatively movable positions.

The second feature is that, with the first packing gland fixed to the rotary equipment body, the first packing tightening mechanism is provided between and connects the first packing gland and the stuffing box such that the first packing gland and the stuffing box are movable relative to one another within specific ranges in the axial and radial directions of the shaft and are urged in the axial direction and held at specific, relatively movable positions, while a second packing tightening mechanism is provided between and connects the second packing gland and the stuffing box such that the second packing gland and the stuffing box are movable relative to one another within specific ranges in the axial and radial directions of the shaft and are urged in the axial direction and held at specific, relatively movable positions.

With a shaft sealing apparatus of such construction, the gland packings placed between the stuff box and the rotating shaft would not change in shaft sealing performance even in cases of axial vibration, eccentricity, or the like, because the stuffing box moves along with the rotating shaft, and as a result there is no change in the relative positions of the two. It is further noted that the first packing gland on the sealed liquid region side is fixed to the rotary equipment body with the stuffing box connected to the first packing gland via the first packing tightening mechanism so that the first packing gland exerts pressure on the gland packings. Therefore, the gland packing closest to the sealed liquid region is the highest in tightening pressure or shaft sealing force. That helps the shaft sealing apparatus of the present invention maintain a good and stable shaft sealing performance, irrespective of the sealing conditions.

In a preferred embodiment, the first packing tightening mechanism comprises a screw bolt extending in the axial direction of the rotating shaft and fixed to the first packing gland, a through hole provided in the flange portion of the stuffing box, the through hole being larger by a specific amount than the screw bolt, a tightening nut engaging with a part of the screw bolt that is backward of and out of the through hole, and a compression coil spring located between the flange and the tightening nut. In another embodiment, the second packing tightening mechanism comprises a screw bolt extending in the axial direction of the rotating shaft and fixed to the stuffing box, a through hole provided in the flange portion of a second packing gland, the through hole being larger than the screw bolt by a specific amount, a tightening nut engaging with a part of the screw bolt that is backward of and out of the through hole, and a compression coil spring located between the flange and the tightening nut. It is desirable to have the stuffing box provided with a partition that divides the seal space into two seal compartments arranged side by side in the axial direction. Gland packings are placed in each seal compartment. It is also desirable that a free-sliding ring slidable in the sealed space in the axial direction be provided between the first packing gland and the gland packings in the seal space.

BRIEF DESCRIPTION OF THE DRAWINGS

FIG. 2 is an illustration showing the distribution of shaft sealing force in the gland packings of the first shaft sealing apparatus.

FIG. 6 is an illustration showing the distribution of shaft sealing force in the gland packings of the third shaft sealing apparatus.

DETAILED DESCRIPTION OF THE PREFERRED EMBODIMENTS

The embodiments of the present invention are described with reference to FIGS. 1 to 9. It is to be understood that the terms "front," "before", or "forward" and "back," "behind", or "backward" are used to denote right and left for convenience in describing the present invention and thus are applicable to the present drawings only.

Embodiment 1

Figure 1:
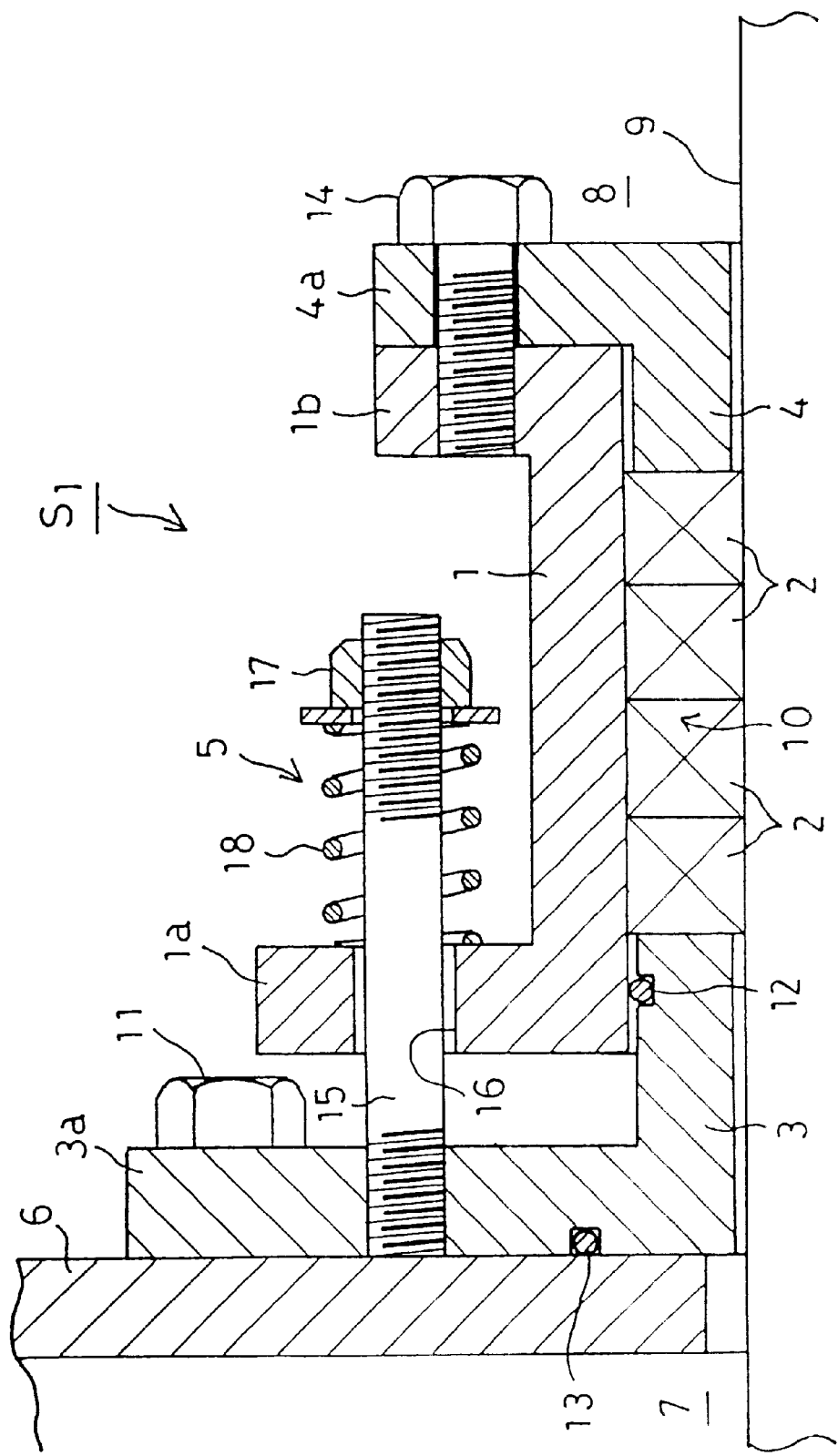
FIG. 1 is a vertical, sectional view of a first shaft sealing apparatus of the present invention.

FIGS. 1 and 2 show a first embodiment of the present invention. As shown in FIG. 1, this first shaft sealing apparatus S1 comprises a stuffing box 1, a plurality of gland packings 2, first and second packing glands 3, 4, and a first packing tightening mechanism 5, and is so constituted that a sealed liquid region 7 inside a rotary equipment body 6 is isolated from an outside atmospheric region 8 with a shaft sealed.

The stuffing box 1 is cylindrical in shape and loosely mounted around a rotating shaft 9 that protrudes into the atmospheric region 8 through the rotary equipment body 6. The stuffing box 1 has first and second flanges 1a, 1b integrally formed therewith at the front and back ends thereof. The inside diameter of the stuffing box 1 is so set in relation to the outside diameter of the rotating shaft 9 as to form an annular sealed space 10 between the inner circumferential surface of the stuffing box 1 and the outer circumferential surface of the rotating shaft 9. The sealed space is large enough to accommodate gland packings 2.

The gland packings 2 are stuffed side by side in the longitudinal direction or the axial direction of the rotating shaft 9 in the scaled space 10. The gland packings 2 are clamped and pressed in the axial direction by the first packing gland on the sealed liquid region side and the second packing gland 4 on the atmospheric region side.

The first packing gland 3 is cylindrical in shape with a portion thereof protruding into the sealed space 10 from the sealed liquid region side and with an annular flange 3a formed integrally at the front end portion. The first packing gland 3 is secured to the rotary equipment body 6 by anchoring the flange 3a to the rotary equipment body 6 with a fixing means 11 such as a bolt. Additionally, O rings 12, 13 are placed in the circumferential contact area between the first packing gland 3 and the stuffing box 1 and in the contact area between the flange 3a and the rotary equipment body 6.

The second packing gland 4 is cylindrical in shape with a portion thereof protruding into the sealed space 10 from the atmospheric region side or from behind the stuffing box 1. The second packing gland 4 is secured to the stuffing box 1 by anchoring an annular flange 4a integrally formed at the back portion to the second flange 1b with a fixing means 14 such as a bolt.

The first packing tightening mechanism 5 comprises a screw bolt 15 screwed into the flange 3a of the first packing gland 3 and extending in the backward direction, a through hole 16 provided in the first flange 1a of the stuffing box 1, the through hole being larger than the screw bolt 15 by a specific amount, a tightening nut 17 engaging with the screw bolt 15 at a place backward of the through hole 16, and a compression coil spring 18 located between the first flange 1a and the tightening nut 17. The first packing tightening mechanism 5 connects the first packing gland 3 and the stuffing box 1 to each other such that the packing gland 3 and the stuffing box 1 are movable relative to one another within specific ranges in the axial and radial directions of the shaft 9, and urged in the axial direction and held at specific, relatively movable positions.

To further illustrate, the first packing tightening mechanism 5 is so designed that as the tightening nut 17 is tightened or advanced forward, the stuffing box 1 is moved forward via the spring 18, and the first packing gland 3 is relatively moved backward in the sealed space 10. In that way, the gland packings 2 are pressed against the second packing gland 4, and are adjusted in tightening pressure. It is also noted that the stuffing box 1 can move freely within the working range of the spring 18 in the axial direction of the rotating shaft 9 and within the range of the diameter difference between the screw bolt 15 and the through hole 16 in the radial direction of the rotating shaft 9. That means that the stuffing box 1 is movable in the axial and radial directions in accordance with axial vibration and eccentricity of the rotating shaft 9 within permissible ranges. The diameter of the through hole 16 is set properly depending on the outside diameter of the screw bolt 15, predicted extents of axial vibration, eccentricity, or the like, to permit such movements of the stuffing box 1 which follow the axial vibration of shaft 9. The screw bolt 15 and the through hole 16 are provided in a plurality of spots (not shown) of the flanges 1a, 3a at a specific interval in the direction of the circumference.

In the first shaft seal apparatus S1 thus built, the stuffing box 1 is connected directly to the first packing gland 3 and indirectly held by the rotary equipment body 6 such that the through hole 16 and the spring 18 permit the stuffing box 1 to move in the axial and radial directions of the rotating shaft 9. When the rotating shaft 9 incurs axial vibration, eccentricity, or the like, the stuffing box 1 will follow such changes in the positions of the rotating shaft 9. That is, the relative positions of the stuffing box 1 and the rotating shaft 9 remain unchanged, even if the rotating shaft 9 undergoes axial vibration, eccentricity, or the like. In turn, an amount of the contact pressure with which the gland packings 2 stuffed in the sealed space 10 between the stuffing box 1 and the rotating shaft 9 are pressed against the rotating shaft 9 (and the stuffing box 1) remains unchanged. Thus, the shaft sealing performance is kept in a good and stable condition.

Also, if the tightening nut 17 is. tightened, the first packing gland 3 is moved backward in relation to the stuffing box 1, pressing the gland packings 2 against the second packing gland 4 on the atmospheric region side. Unlike the prior art apparatus, therefore, the gland packing 2 closest to the sealed liquid region (i.e., the foremost one) has a highest tightening pressure—or shaft sealing force P—of the gland packings 2, as shown in FIG. 2. That way, a good and stable shaft sealing performance can be ensured irrespective of shaft sealing conditions.

Embodiment 2

Figure 3:
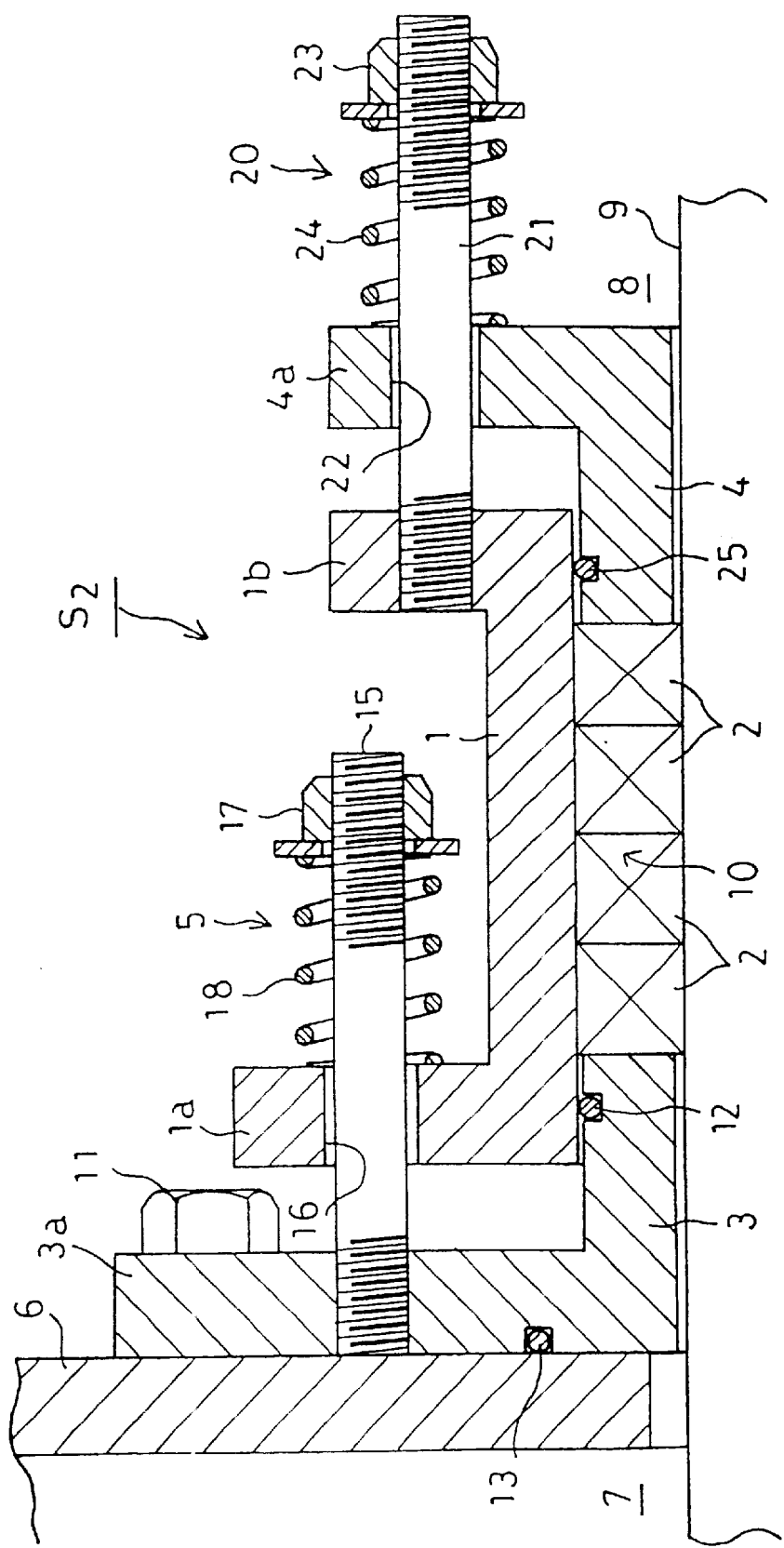
FIG. 3 is a vertical, sectional view of a second shaft sealing apparatus of the present invention.
Figure 4:
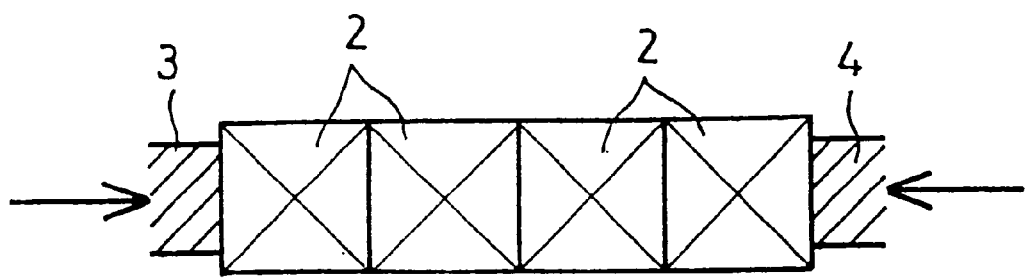
FIG. 4 is an illustration showing the distribution of shaft sealing force in the gland packings of the second shaft sealing apparatus.
Figure 4:
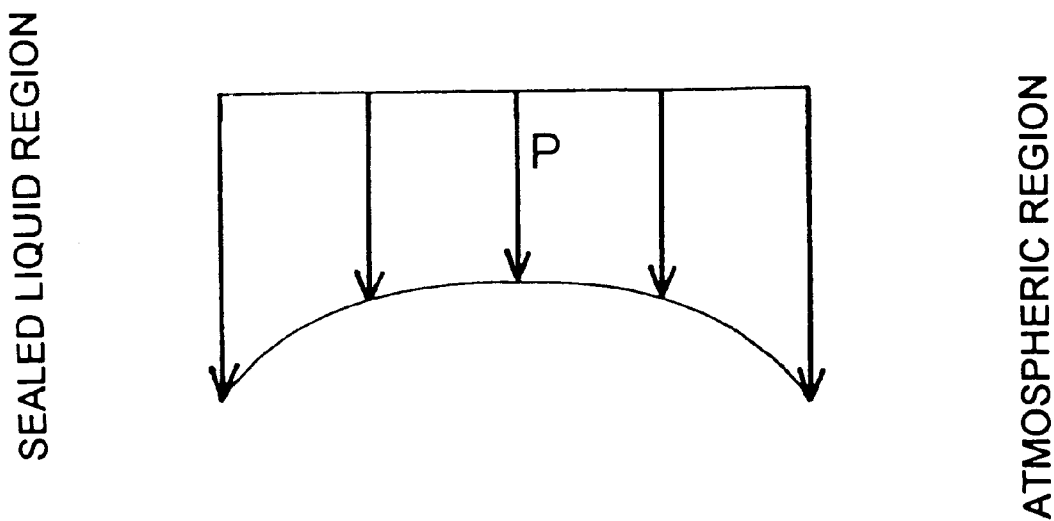

FIGS. 3 and 4 show a second embodiment of the present invention. A shaft seal apparatus S2 as shown in FIG. 3 is of the same construction as the first shaft seal apparatus S1 except that a second packing tightening mechanism 20 is provided between the stuffing box 1 and the second packing gland 4.

The second packing tightening mechanism 20 is of the same construction as the first packing tightening mechanism 5. That is, the second packing tightening mechanism 20 comprises a screw bolt 21 screwed into the second flange 1b of the stuffing box 1 and extending in the backward direction, a through hole 22 provided in the flange 4a of the second packing gland 4, the through hole being larger in diameter than the screw bolt 21 by a specific amount, a tightening nut 23 engaging with the screw bolt 21 at a place backward of and out of the through hole 22, and a compression coil spring 24 located between the flange 4a and the tightening nut 23. The second packing tightening mechanism 20 connects the stuffing box 1 and the second packing gland 4 to each other such that the stuffing box 1 and the packing gland 4 are relatively movable within specific ranges in the axial and radial directions of the rotating shaft 9, and urged in the axial direction and held at specific, relatively movable positions. That is, the second packing tightening mechanism 20 is so designed that as the tightening nut 23 is tightened or screwed forward, the two flanges 1b, 4a approach each other with the result that the second packing gland 4 is relatively moved forward in the sealed space 10, pressing the gland packings 2 forward. An O ring 25 is placed between the opposing circumferential surfaces of the second packing gland 4 and the stuffing box 1.

In the second shaft sealing apparatus S2, as the tightening nuts 17, 23 are tightened, the gland packings 2 are pressed from the forward and backward sides. As a result, the gland packing 2 closest to the sealed liquid region and the atmospheric region has a highest tightening pressure, or shaft sealing force P, of the packings 2, as shown in FIG. 4. As a whole, a further increase is observed in shaft sealing force P in comparison with the first shaft seal apparatus S1 in which the gland packings 2 are pressed from the forward or backward side.

In case the rotating shaft 9 undergoes axial vibration, eccentricity, or the like, the first and second packing tightening mechanisms 5, 20 allow the stuffing box 1 and the second packing gland 4 to move following the move of the rotating shaft 9, freeing the gland packings 2 from load due to axial vibration, eccentricity, or the like, and ensuring a good and stable shaft sealing performance as in the first shaft sealing apparatus.

Embodiment 3

Figure 5:
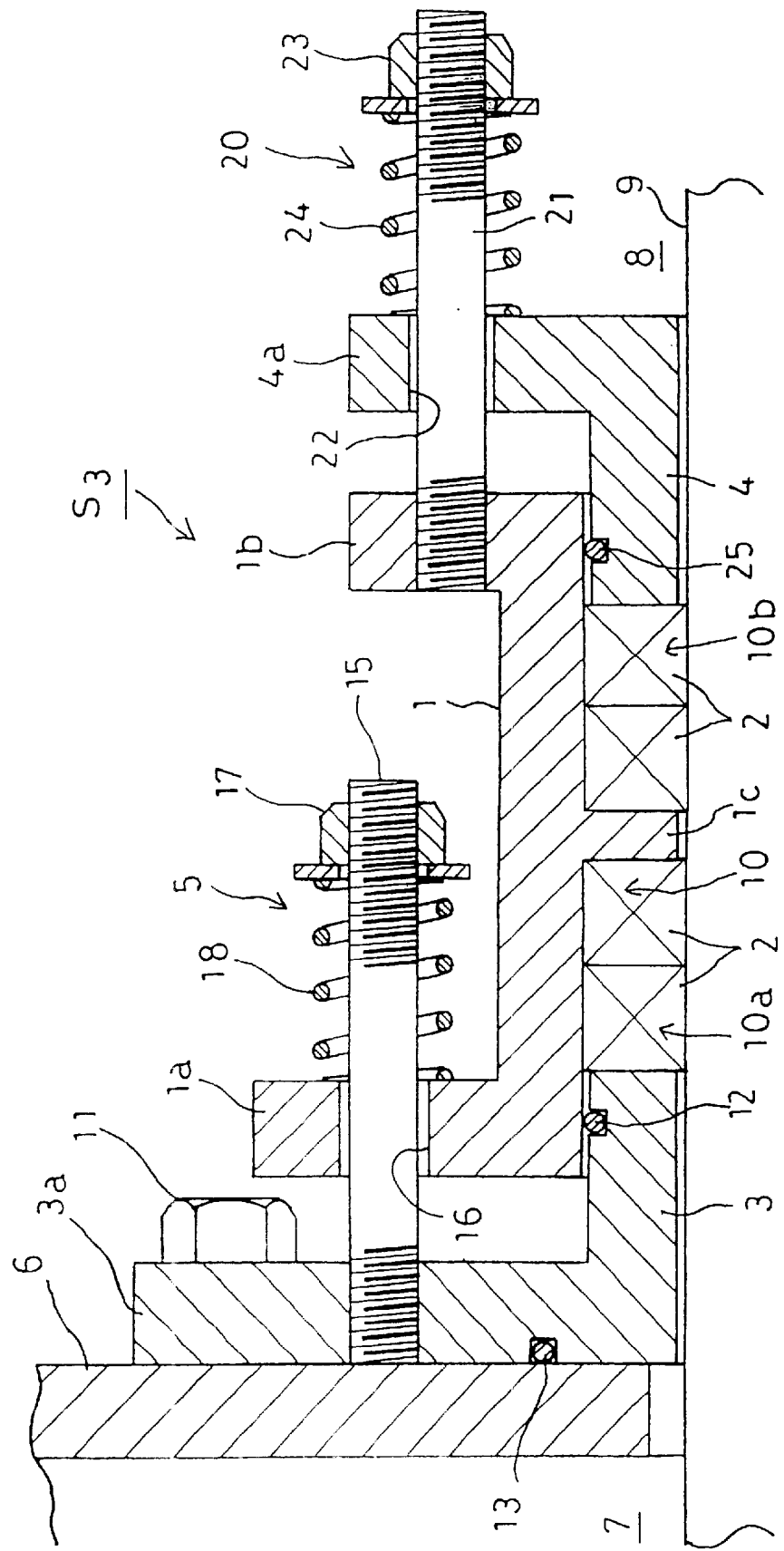
FIG. 5 is a vertical, sectional view of a third shaft sealing apparatus.

FIGS. 5 and 6 show a third embodiment of the present invention. A shaft seal apparatus S3 as shown in FIG. 5 is of the same construction as the second shaft seal apparatus S2 except that the stuffing box 1 is provided with a partition 1c that divides the sealed space 10 into two seal compartments arranged side by side in the axial direction of the rotating shaft 9 so that the gland packings 2 are stuffed in the two seal compartments 10a, 10b.

The partition 1c is ring-shaped and integrally formed with the stuffing box 1 in the middle of the axial direction at the inner circumferential surface thereof. The gland packings 2 stuffed in the seal compartment 10a between the partition 1c and the first packing gland 3 are pressed against the partition 1c by the first packing gland 3. At the same time, the gland packings 2 stuffed in the seal compartment 10b between the partition 1c and the second packing gland 4 are pressed against the partition 1c by the second packing gland 4.

In the third shaft seal apparatus S3, therefore, the gland packing 2 closest to the sealed liquid region (i.e., the foremost one) has a highest tightening pressure, or shaft sealing pressure P, of the gland packings 2 in the compartment 10a, while the gland packing 2 closest to the atmospheric region (i.e., the rearmost one) has a highest tightening pressure of the gland packings in the compartment 10b, as shown in FIG. 6. Since, in addition, the gland packings 2 stuffed in the seal compartments 10a, 10b are adjusted in tightening pressure separately by the respective tightening nuts 17, 23, the tightening pressure or shaft sealing force P can be regulated depending on the shaft sealing conditions.

In case the rotating shaft undergoes axial vibration, eccentricity, or the like, the first and second packing tightening mechanisms 5, 20 allow the stuffing box 1 and the second packing gland 4 to move following the move of the rotating shaft 9, freeing the gland packings 2 from load due to axial vibration, eccentricity, or the like, and ensuring a good and stable shaft sealing performance as in the second shaft seal apparatus.

Figure 7:
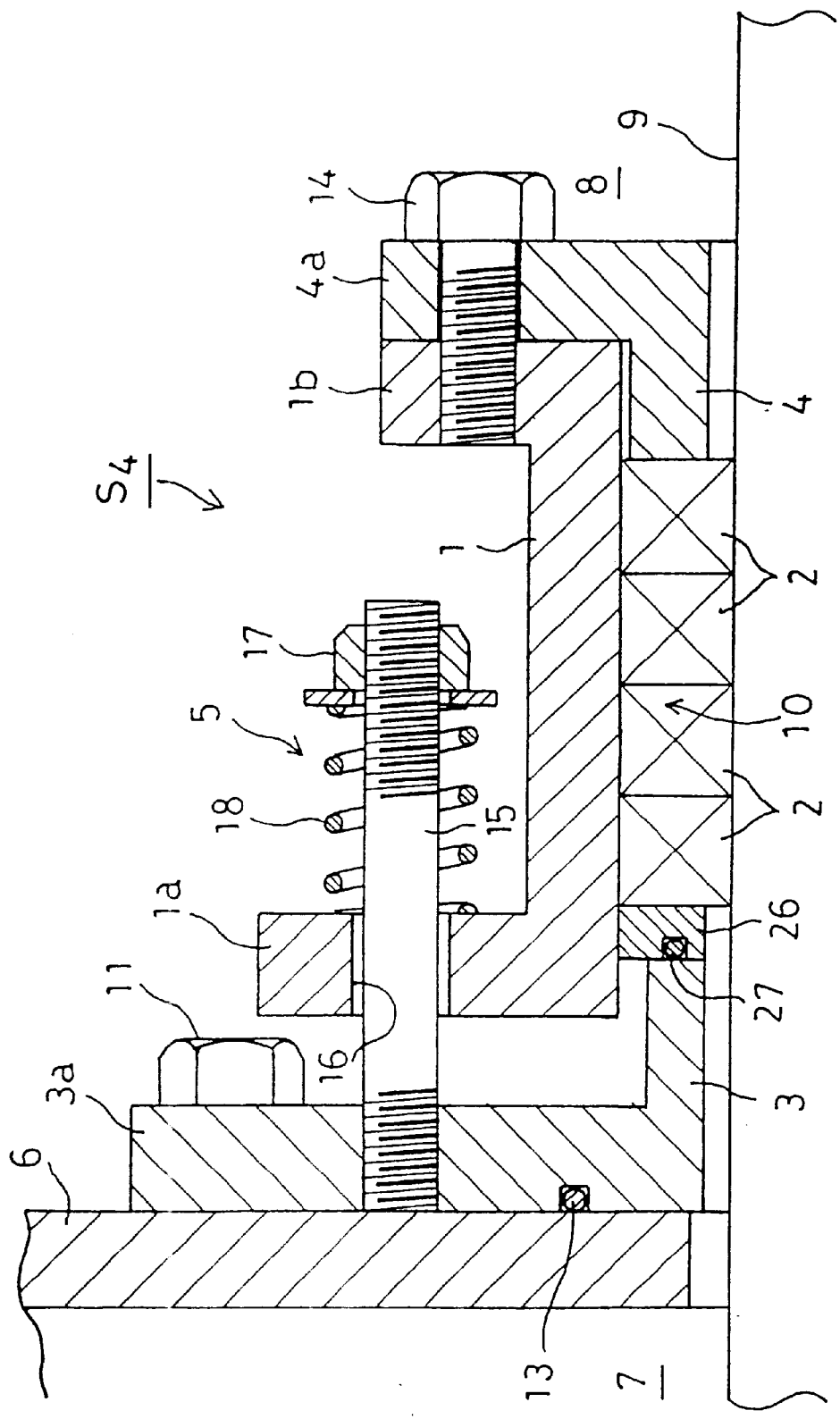
FIG. 7 is a vertical, sectional view of a fourth shaft sealing apparatus of the present invention.
Figure 8:
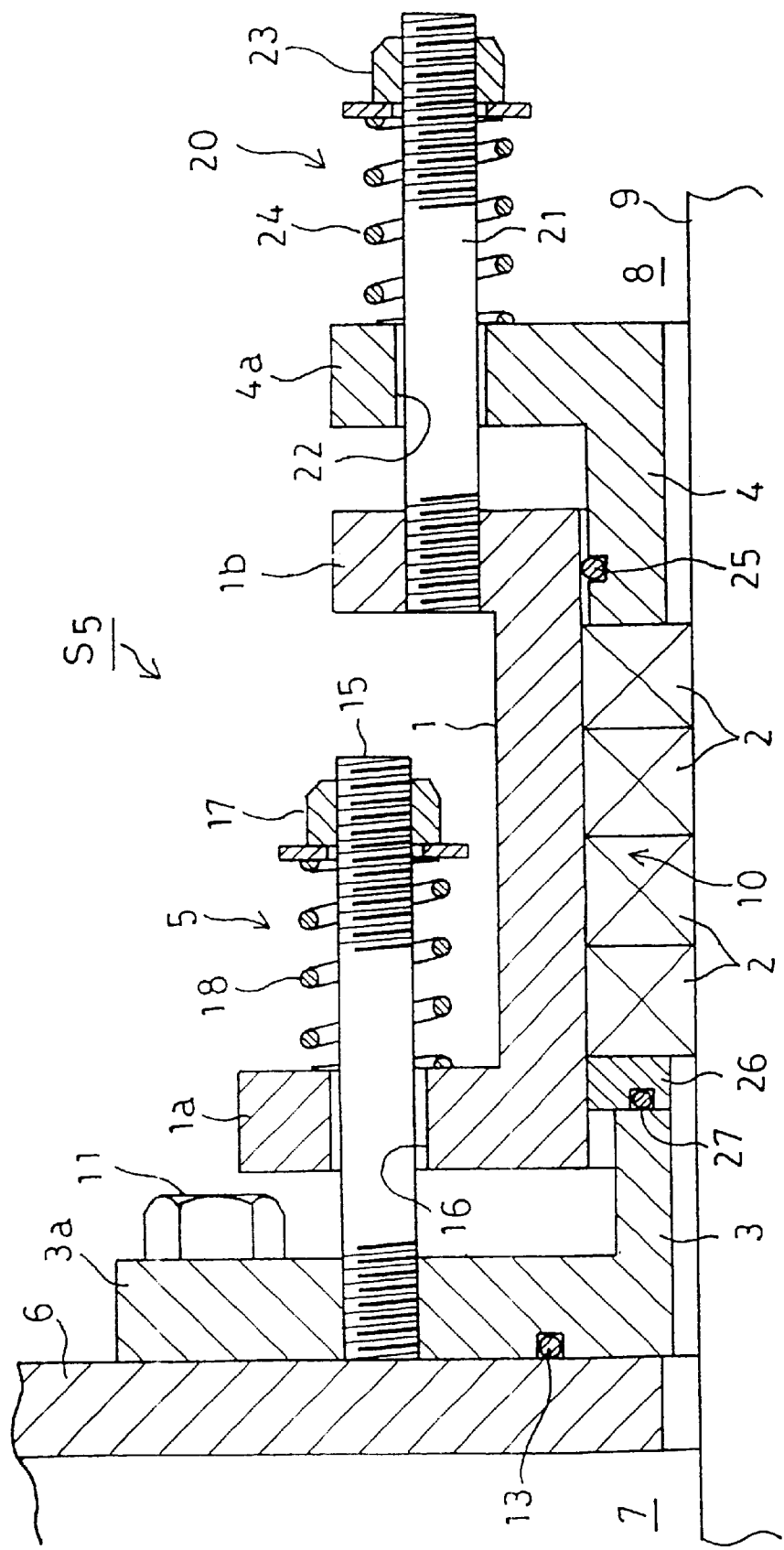
FIG. 8 is a vertical, sectional view of a fifth shaft sealing apparatus of the present invention.
Figure 9:
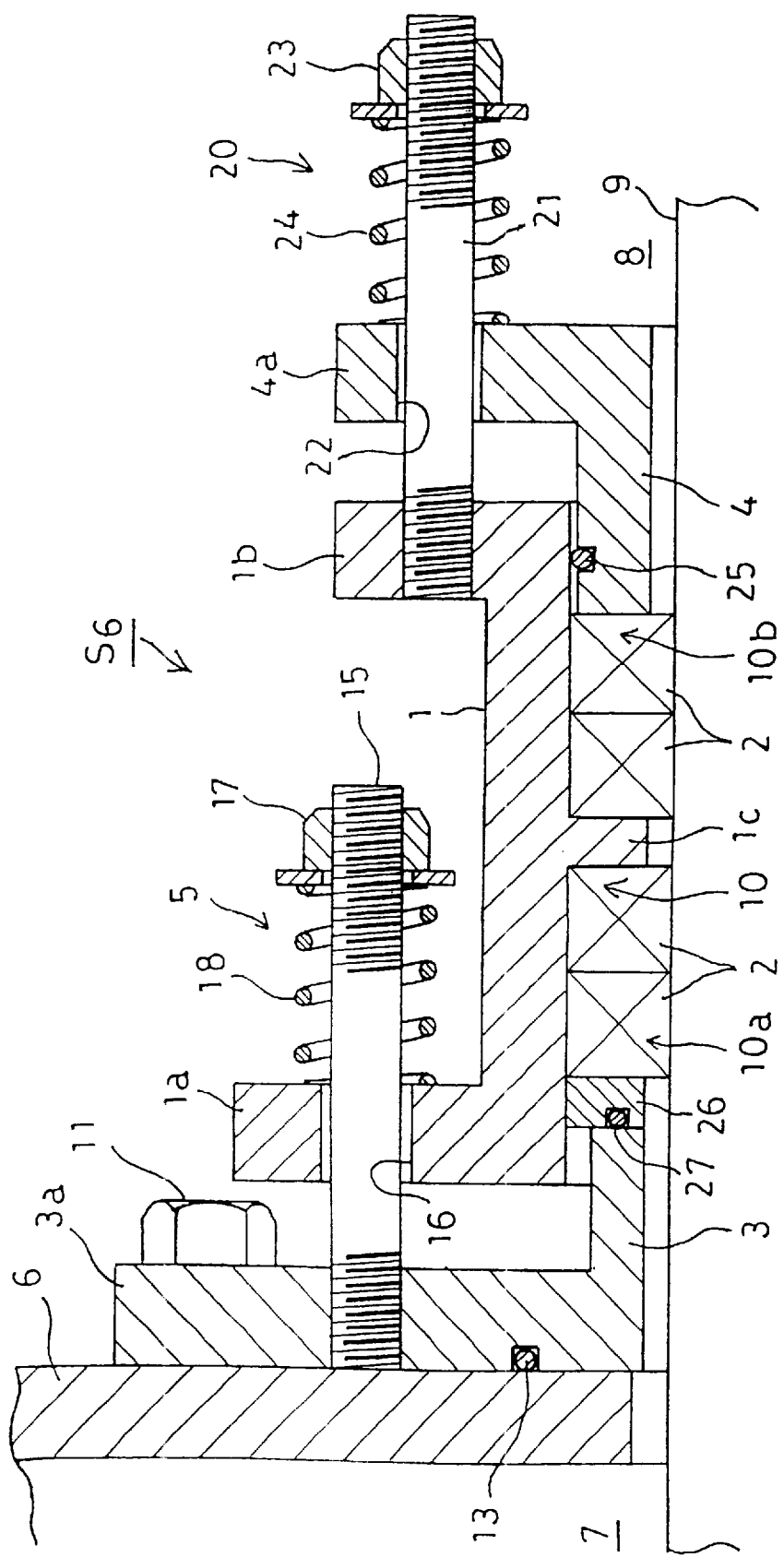
FIG. 9 is a vertical, sectional view of a sixth shaft sealing apparatus of the present invention.
Figure 10:
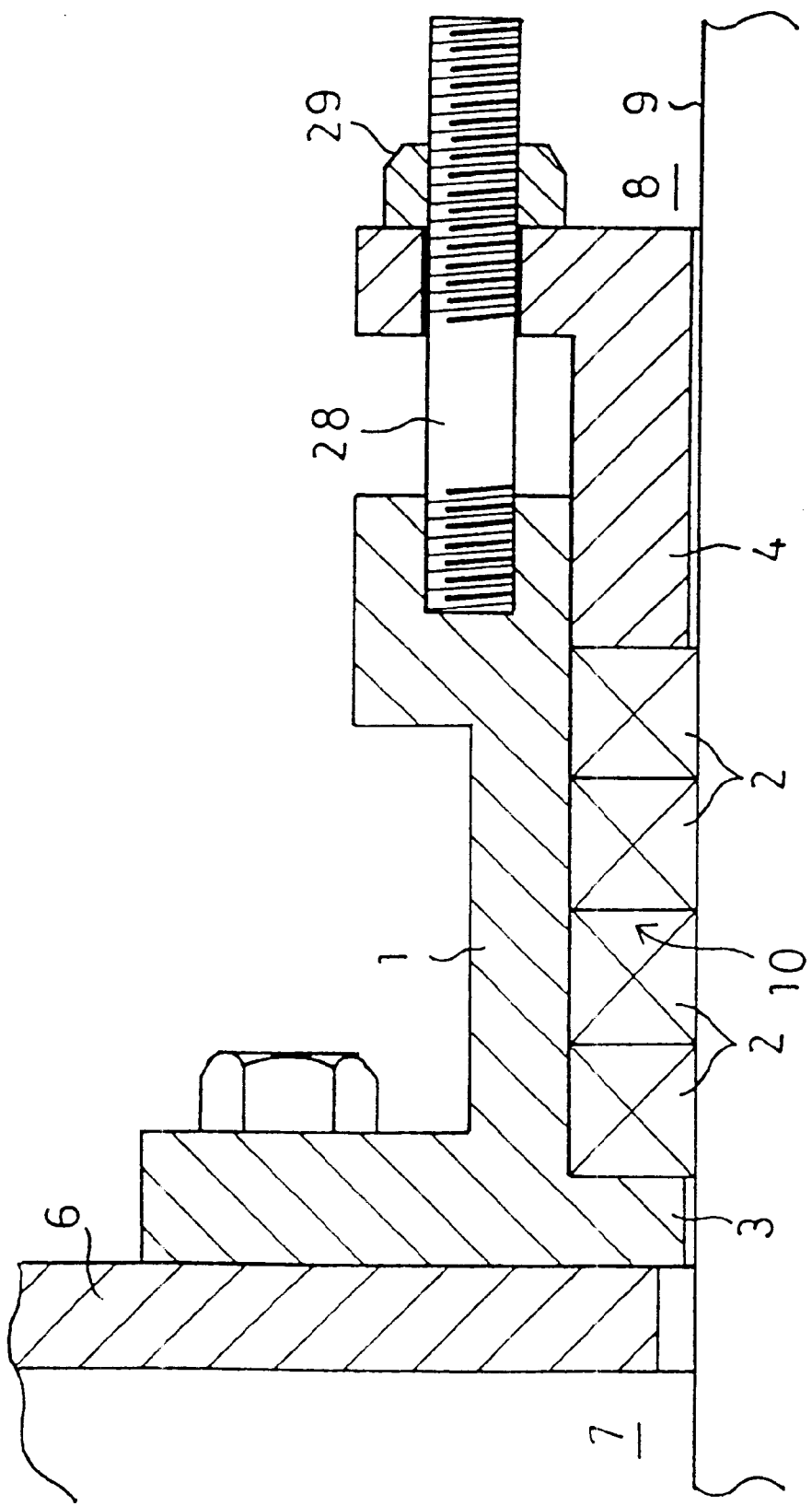
FIG. 10 is a vertical, sectional view of a prior art apparatus.
Figure 11:
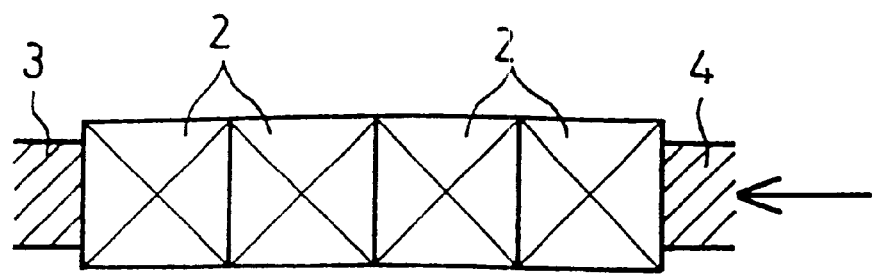
FIG. 11 is an illustration showing the distribution of shaft sealing force in the gland packings of the prior art shaft sealing apparatus.
Figure 11:
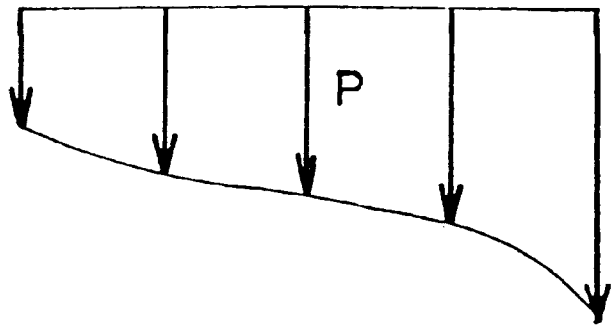

FIGS. 7, 8, and 9 show fourth, fifth, and sixth embodiments of the present invention. The shaft sealing apparatuses in those embodiments are of the same construction as the foregoing shaft seal apparatuses S1, S2, and S3, except for the following points.

Embodiment 4

A fourth shaft seal apparatus S4 in the fourth embodiment is shown in FIG. 7. In this embodiment, a slidable sliding ring 26 is provided between the first packing gland 3 and the gland packing 2 closest to the sealed liquid region within the seal space 10. The ring 26 is to help the first packing gland 3 and the gland packing 2 move in the radial direction more smoothly in relation to each other. That is, the frictional resistance between the first packing gland 3 and the sliding ring 26 is smaller than that between the first packing gland 3 and the gland packing 2. Hence, the sliding ring 26 helps the stuffing box 1 to follow the radial move of the rotating shaft 9 caused by axial vibration, eccentricity, or the like more smoothly than in the first shaft seal apparatus S1, in which the first packing gland 3 is allowed to contact the gland packing 2. Such a follow-up movement is made more smooth by placing an O ring 27 in the contact area between the first packing gland 3 and the sliding ring 26. The O ring 27 reduces the frictional resistance between the two parts 3 and 26 and serves as secondary seal therebetween. Furthermore, the inside diameter of the packing glands 3, 4 (and the sliding ring 26) is set so that the difference between the above-mentioned inside diameter and the outside diameter of the rotating shaft 9 is larger than that in the first shaft seal apparatus S1. Thus, even in case of great axial vibration, eccentricity, or the like, the stuffing box 1 could move following the movement of the shaft 9. Except for those points, the fourth shaft sealing apparatus S4 is identical with the first shaft seal apparatus S1 in construction.

Embodiment 5

A fifth shaft seal apparatus S5 in the fifth embodiment is identical with second shaft seal apparatus S2 except that the same features as in the fourth shaft seal apparatus S4 are incorporated. That is, the fifth shaft seal apparatus S5 is provided with the sliding ring 26 and O ring 27 having the same construction and function as those of the fourth shaft seal apparatus S4 between the first packing gland 3 and the gland packing 2 closest to the sealed liquid region as shown in FIG. 8. In addition, the inside diameter of the packing glands 3, 4 (and the sliding ring 26) is made larger as in the fourth shaft seal apparatus S4. Thus, even in case the rotating shaft 9 is subjected to great axial vibration, eccentricity, or the like, the stuffing box 1 can provide a smooth follow-up movement.

Embodiment 6

A sixth shaft seal apparatus S6 in the sixth embodiment is the same as third shaft seal apparatus S3, except that the same features as in the fourth shaft seal apparatus S4 or the fifth shaft seal apparatus S5 are incorporated. That is, the sixth shaft seal apparatus S6 is provided with the sliding ring 26 and O ring 27 having the same construction and function as those of the fourth or fifth shaft seal apparatus S4 or S5 between the first packing gland 3 and the gland packing 2 closest to the sealed liquid region, as shown in FIG. 9. In addition, the inside diameter of the packing glands 3, 4 (and the sliding ring 26) is made larger as in fourth or fifth shaft seal apparatus S4 or S5. Thus, even in case the rotating shaft 9 is subjected to great axial vibration, eccentricity, or the like, the stuffing box 1 can provide a smooth follow-up movement.

All component materials of shaft seal apparatuses S1, S2, S3, S4, S5, and S6 except for the gland packings 2 and O rings 12, 13, 25, and 27 are made of metallic materials selected depending on the shaft sealing conditions.

It is understood that the present invention is not limited to the embodiments just described but may be changed or modified without departing from the basic principle of the present invention. For example, depending on the configuration of the rotary equipment body 6, mounting conditions of the shaft seal apparatus, it is possible to fix the screw bolt 15 of the first packing tightening mechanism 5 to the stuffing box 1 and to form the through hole 16 in the first packing gland 3. Alternatively, the screw bolt 21 of the second packing tightening mechanism 20 may also be secured to the second packing gland 4, with the through hole 22 formed in the stuffing box 1. Also, a low-friction material layer may be coated on one side of the contact area of the first packing gland 3 or the sliding ring 26.

What is claimed:

1. A shaft seal apparatus for sealing a rotating shaft of a rotary equipment body having a sealed liquid region therein, said shaft having radial and axial directions, said apparatus having a sealed liquid side and an atmospheric region side, said apparatus comprising:

a stuffing box mounted around a rotating shaft;

a plurality of gland packings stuffed in a cylindrical sealed space formed between said rotating shaft and said stuffing box; and a first packing gland on the sealed liquid region side and a second packing gland on the atmospheric region side, wherein said gland packing are pressed between said first and second packing glands, thereby sealing a sealed liquid region within a rotary equipment body;

wherein said first packing gland is fixed to the rotary equipment body;

wherein a first packing tightening mechanism is provided between and connects said first packing gland and said stuffing box, such that said first packing gland and said stuffing box are movable relative to one another in the axial and radial directions of the rotating shaft within specific ranges, urged in the axial direction and held at specific, relatively movable positions; and wherein a second packing tightening mechanism is provided between and connects said second packing gland and said stuffing box, such that said second packing gland and said stuffing box are movable relative to one another in the axial and radial directions of the rotating shaft within specific ranges and are urged in the axial direction and held at specific, relatively movable positions.

2. The shaft seal apparatus as defined in any one of claim 1, wherein said shaft seal apparatus further comprises a sliding ring slidable in the sealed space between the first packing gland and the plurality of gland packings.

3. The shaft seal apparatus as defined in any one of claim 1, wherein said stuffing box has a first flange and a second flange;

wherein said first packing tightening mechanism comprises:

a screw bolt extending in the axial direction of the rotating shaft and fixed to the first packing gland, a through hole through which the screw bolt extends provided in the first flange of the stuffing box, said through hole being larger in diameter than the screw bolt by a specific amount;

a tightening nut engaging with a part of said screw bolt that is out of and backward of the through hole; and a compression coil spring mounted on said screw bolt and located between the first flange of said stuffing box and said tightening nut.

4. The shaft seal apparatus as defined in claim 1, wherein said second packing gland has a flange; and wherein said second packing tightening mechanism comprises:

a screw bolt extending in the axial direction of the rotating shaft and fixed to the stuffing box, a through hole provided in the flange of said second packing gland through which said screw bolt extends, said through hole larger in diameter than the screw bolt by a specific amount;

a tightening nut engaging with a part of the screw bolt that is out of and backward of the through hole; and a compression coil spring mounted on the screw bolt and located between the flange of said second parking gland and the tightening nut.

5. The shaft seal apparatus as defined in claim 1, wherein said stuffing box is provided with a partition dividing the sealed space into two compartments arranged side by side in the axial direction of the rotating shaft, wherein the two compartments are stuffed with gland packings.

6. The shaft seal apparatus as defined in claim 5, wherein said shaft seal apparatus further comprises a sliding ring slidable in the sealed space between the first packing gland and the plurality of gland packings.

* * * * *